US006534461B2

(12) United States Patent
Lallier

(10) Patent No.: US 6,534,461 B2
(45) Date of Patent: Mar. 18, 2003

(54) STRIPPING COMPOSITION WHICH CAN BE USED IN PARTICULAR IN THE CONSTRUCTION AND YACHTING FIELD

(75) Inventor: Jean-Pierre Lallier, Herblay (FR)

(73) Assignee: ATOFINA, Puteaux (FR)

( * ) Notice: Subject to any disclaimer, the term of this patent is extended or adjusted under 35 U.S.C. 154(b) by 87 days.

(21) Appl. No.: 09/866,472

(22) Filed: May 29, 2001

(65) Prior Publication Data

US 2002/0032138 A1 Mar. 14, 2002

(30) Foreign Application Priority Data

May 26, 2000 (FR) .............................. 00 06755

(51) Int. Cl.$^7$ ................................ C11D 3/44
(52) U.S. Cl. .................. 510/206; 510/201; 510/202; 510/211; 510/212; 134/38
(58) Field of Search ................ 510/201, 202, 510/206, 211, 405, 432, 365, 417, 212; 134/38

(56) References Cited

U.S. PATENT DOCUMENTS

| 4,780,235 A | | 10/1988 | Jackson |
| 4,927,556 A | * | 5/1990 | Pokorn |
| 5,215,675 A | * | 6/1993 | Wilkins et al. |
| 5,929,005 A | * | 7/1999 | Smith |
| 6,040,284 A | * | 3/2000 | Marquis et al. |
| 6,057,276 A | * | 5/2000 | Smith |
| 6,103,682 A | * | 8/2000 | Lallier |
| 6,165,962 A | * | 12/2000 | Kaler et al. |
| 6,369,009 B1 | * | 4/2002 | Machac, Jr. et al. |

FOREIGN PATENT DOCUMENTS

| WO | 9318101 | 9/1993 |

* cited by examiner

Primary Examiner—Gregory E. Webb
(74) Attorney, Agent, or Firm—Millen, White, Zelano & Branigan, P.C.

(57) ABSTRACT

The invention relates to a stripping composition which can be used in the construction field, especially for the stripping of external organic coatings, such as exterior waterproof coatings and thin films, and in the yachting field, for the stripping of antifouling coatings, characterized in that it comprises:

at least one dibasic ester, at least one dipolar aprotic solvent, at least one inorganic filler, water, at least one cellulose thickener, at least one dispersing agent and activators.

24 Claims, No Drawings

STRIPPING COMPOSITION WHICH CAN BE USED IN PARTICULAR IN THE CONSTRUCTION AND YACHTING FIELD

The present invention relates to a stripping composition which can be used in particular in the construction field, especially for the stripping of external organic coatings, such as thick plastic coatings (TPC), exterior waterproof coatings and thin films, and in the yachting field, for the stripping of antifouling paints.

Exterior waterproof coatings, with a rubbery appearance, are impermeable to air, to oxygen and to water vapour and are based on acrylic or styrene-acrylic polymers.

In the construction field, most paint strippers are based on methylene chloride with methanol added. They can be thickened with cellulose compounds and can comprise an inorganic filler.

However, there is an increasing search to replace methylene chloride because of its very high volatility and very high noxiousness. Replacement products for the synergistic methylene chloride-methanol mixture exist but they are generally much more expensive and form at least 90% by weight of the composition of the formulation. The remaining 10% are composed of a thickener (generally chosen from cellulose or acrylic derivatives), itself generally even more expensive than the solvents, and various additives: activator, surfactant or corrosion inhibitor.

In the yachting field, the stripping of the antifouling coating, composed of numerous paint layers (5 to 10), is carried out by sanding down. This way of operating is lengthy and produces a great deal of dust. In addition, the use of stripping formulas based on methylene chloride is prohibited as they attack the gelcoat, which is a leaktight coating.

A subject-matter of the present invention is thus a stripping composition which can be used in particular in the construction field, especially for the stripping of exterior waterproof coatings, thick plastic coatings (TPC) and thin films, and in the yachting field, for the stripping of antifouling paints, characterized in that it comprises:
- (A) at least one dibasic ester,
- (B) at least one dipolar aprotic solvent,
- (C) at least one inorganic filler with a thickening nature,
- (D) water,
- (E) at least one activator,
- (F) at least one dispersant, and
- (G) at least one cellulose thickener.

The composition according to the invention can comprise, per 100 parts by weight of (A)+(B)+(C)+(D)+(E)+(F)+(G):
- 10 to 50, in particular 25 to 45, parts by weight of (A);
- 10 to 30, in particular 15 to 25, parts by weight of (B);
- 20 to 40, in particular 25 to 35, parts by weight of (C);
- 10 to 25, in particular 15 to 20, parts by weight of (D);
- 1 to 15, in particular 1 to 10, parts by weight of (E);
- 0.2 to 2, in particular 0.4 to 1.2, parts by weight of (F); and
- 0.2 to 1, in particular 0.3 to 0.6, part by weight of (G).

The dibasic ester or esters (A) are chosen in particular from aliphatic dibasic esters, in particular $C_1$–$C_4$ alkyl diesters of one or more $C_4$–$C_6$ aliphatic dibasic acids. Mention may in particular be made of dimethyl succinate, dimethyl glutarate, dimethyl adipate and their mixtures.

The dipolar aprotic solvents (B) are advantageously chosen from dimethyl sulphoxide, N-methylpyrrolidone, propylene carbonate, dimethylformamide, acetonitrile, N-methylmorpholine, butyrolactone and dimethylacetamide. Dimethyl sulphoxide and N-methylpyrrolidone are preferred.

The term "inorganic filler with a thickening nature (C)" is understood to mean a natural or synthetic inorganic powder which can result in formulations for which the viscosity is of the order of 6 000 mPa·s at 20 revolutions/min or 2 000 mPa·s at 100 revolutions/min.

The inorganic filler or fillers generally have a mean particle size of between 0.1 and 200 μm, more particularly between 1 and 100 μm. A finer particle size makes it possible to obtain the same viscosity while using less filler, which is not economically desirable.

Mention may be made, as examples of inorganic fillers, of calcium carbonate, silica, calcium phosphite, calcium hydroxide ($Ca(OH)_2$), clay or bentonite. Preferably, calcium phosphite will be used.

Mention will be made, as activators (E) which can be used according to the present invention, of alkyl alkoxypropionates, such as ethyl 3-ethoxypropionate (EEP), terpenes, such as D-limonene, or the mixture of these compounds.

Use will preferably be made of ethyl 3-ethoxypropionate and/or D-limonene.

Mention may be made, as example of dispersing agent (F), of the acidic phosphoric ester of 2-ethylhexanol, sold by Ceca under the name Beycostat A081.

Mention may be made, as example of cellulose thickener (G), of Methocell 311, sold by Dow Chemical Co., the process for the preparation of which is disclosed in U.S. Pat. No. 3,388,082, entitled "Hydroxypropyl methyl cellulose ethers".

The stripping composition of the invention has proved to be highly advantageous; this is because, after it has been applied and then left to act for a few tens of minutes, it is sufficient to shift the dry strips using a paint knife. Wet and sticky waste, which is always difficult to remove and to treat, is avoided and most of the time a clean substrate, such as a concrete or brick wall, is obtained.

In addition, in the yachting field, the stripping composition does not attack the gelcoat layer, which is a leaktight coating generally of polyester.

The stripping composition according to the present invention also exhibits the advantage of being stable on storage.

The following examples illustrate the present invention.
In these examples, the ingredients used are as follows:
Dibasic ester:
DBE=dibasic ester having the following composition (as % by weight):
dimethyl adipate/dimethyl glutarate/dimethyl succinate: 15/62/23, sold by Rhône-Poulenc under the name RPDE.
Polar aprotic solvent: DMSO
Activators used=D-limonene and ethyl 3-ethoxypropionate of formula $C_2H_5O$—$CH_2CH_2CO_2C_2H_5$, hereinafter denoted by EEP.
Cellulose thickener=cellulose thickener sold by Dow Chemical Co. under the name Methocell 311.
Dispersing agent=acidic phosphoric ester of 2-ethylhexanol, sold under the name Beycostat A81.
$CaHPO_3$=natural calcium phosphite, produced by Ceca.

All the preparations are carried out at ambient temperature (25° C.) and with stirring (approximately 400 revolutions/min), preferably with a turbine which makes possible dispersion of solids in the liquids. The solvents (DMSO, DBE), the D-limonene, the water and the dispersant are introduced first. Then the calcium phosphite and the cellulose thickener are added.

In these examples, all the proportions cited are in parts by weight.

PREPARATION EXAMPLE 1

| | |
|---|---|
| DMSO | 12 |
| DBE | 35 |
| D-Limonene | 5 |
| Water | 17 |
| Beycostat A81 | 0.5 |
| Methocell 311 | 0.4 |
| Calcium phosphite | 30 |

The flash point of the formula is 62° C.

PREPARATION EXAMPLE 2

| | |
|---|---|
| DMSO | 10.2 |
| DBE | 29.6 |
| D-Limonene | 4.2 |
| EEP | 8 |
| Water | 17 |
| Beycostat A81 | 0.7 |
| Methocell 311 | 0.5 |
| Calcium phosphite | 30 |

The flash point of the formula is 64° C.

PREPARATION EXAMPLE 3

| | |
|---|---|
| DMSO | 12 |
| DBE | 35.1 |
| EEP | 5 |
| Water | 17 |
| Beycostat A81 | 0.4 |
| Methocell 311 | 0.4 |
| Calcium phosphite | 30 |

PREPARATION EXAMPLE 4

Not in Accordance with the Invention

| | |
|---|---|
| DMSO | 12.77 |
| DBE | 37.23 |
| D-Limonene | 5.32 |
| Beycostat A81 | 1.06 |
| Methocell 311 | 0.21 |
| Calcium phosphite | 50 |

After having produced the three preparations described above and having left them to stand for two days, it is found that Preparation 4 has set solid, whereas Preparations 1, 2 and 3 have remained flowing.

Preparation 4 thus has to be stirred in order to be able to be decanted or to be deposited. Preparations 1, 2 and 3 can be decanted or can be deposited without any preliminary stirring.

APPLICATIONAL EXAMPLE 1

This applicational example relates to the construction stripping of an exterior coating such as TPC (thick plastic coating). More specifically, it relates to the stripping of an acrylic roughcast with a thickness of approximately 2 mm deposited on brick.

After depositing Preparations 1, 2, 3 and 4 in a thick layer (thickness of 0.5 to 1 mm) and waiting for the necessary time, the coating is scraped off with a knife, resulting in the formation of dry strips.

On this type of coating, the time of action has to be 6 h for Preparation 4, 5 h for Preparation 1 and 4 h for Preparations 2 and 3.

APPLICATIONAL EXAMPLE 2

This applicational example relates to the construction stripping of an exterior coating such as an exterior waterproofing agent known as Paradox (Plasdox) deposited in 2 layers on brick.

On this coating, the formulas 1, 2 and 3 result in stripping after approximately 1 to 2 h, giving strips by scraping with a knife.

The formulas 2 and 3 seem to give better results, leaving the substrate bare.

APPLICATIONAL EXAMPLE 3

This applicational example relates to the use of the formulas 1, 2 or 3 for the stripping of an antifouling coating from a 9-meter boat.

The stripping was carried out during the day.

In connection with certain components of the composition, it is to be understood that the "activator" accelerates kinetics of the stripping, and the "dispersant" results in a stable dispersion of the inorganic filler in the stripping composition.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/06.755, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A stripping composition, comprising per 100 parts of (A)+(B)+(C)+(D)+(E)+(F) and (G):
    (A) 10 to 50 parts by weight of at least one dibasic ester,
    (B) 10 to 30 parts by weight of at least one dipolar aprotic solvent,
    (C) 20 to 40 parts by weight of at least one inorganic filler with a thickening nature,
    (D) 10 to 25 parts by weight of water,
    (E) 1 to 15 parts by weight of at least one activator,
    (F) 0.2 to 2 parts by weight of at least one dispersant, and
    (G) 0.2 to 1 part by weight of at least one cellulose thickener.

2. A stripping composition according to claim 1, wherein comprising, per 100 parts by weight of (A)+(B)+(C)+(D)+(E)+(F)+(G):
    25 to 45 parts by weight of (A),
    15 to 25 parts by weight of (B), 25 to 35 parts by weight of (C),
15 to 20 parts by weight of (D),
1 to 10 parts by weight of (E),
0.4 to 1.2 parts by weight of (F), and
0.3 to 0.6 parts by weight of (G).

3. A stripping composition according to claim 2, wherein:
(A) comprises at least one of dimethyl adipate, dimethyl glutarate, and dimethyl succinate,
(B) comprises dimethyl sulfoxide,
(C) comprises Ca $HPO_3$,
(D) is water,
(E) comprise at least one of D-limonene and ethyl 3-ethoxy propionate,
(F) comprise an acidic phosphine ester of 2-ethyl hexanol, and
(G) methyl cellulose.

4. A stripping composition according to claim 1, wherein the dibasic esters (A) are aliphatic dibasic esters.

5. A stripping composition according to claim 1, wherein the dibasic ester or esters (A) comprises dimethyl succinate, dimethyl glutarate, dimethyl adipate or mixtures thereof.

6. A stripping composition according to claim 1, wherein the dipolar aprotic solvent or solvents (B) comprise(s) dimethyl sulphoxide, N-methypyrrolidone, propylene carbonate, dimethylformamide, acetonitrile, N-methylmorpholine, butyrolactone and dimethylacetamide or mixtures thereof.

7. A stripping composition according to claim 5, wherein the dipolar aprotic solvent or solvents (B) comprise(s) dimethyl sulphoxide, N-methypyrrolidone, propylene carbonate, dimethylformamide, acetonitrile, N-methylmorpholine, butyrolactone and dimethylacetamide or mixtures thereof.

8. A stripping composition according to claim 1, wherein the inorganic filler (C) comprises calcium phosphite.

9. A stripping composition according to claim 5, wherein the inorganic filler (C) comprises calcium phosphite.

10. A stripping composition according to claim 6, wherein the inorganic filler (C) comprises calcium phosphite.

11. A stripping composition according to claim 7, wherein the inorganic filler (C) comprises calcium phosphite.

12. A stripping composition according to claim 1, wherein activator (E) comprises ethyl 3-ethoxypropionate and/or D-limonene.

13. A stripping composition according to claim 5, wherein activator (E) comprises at least one of ethyl 3-ethoxypropionate and D-limonene.

14. A stripping composition according to claim 6, wherein activator (E) comprises at least one of ethyl 3-ethoxypropionate and D-limonene.

15. A stripping composition according to claim 7, wherein activator (E) comprises at least one of ethyl 3-ethoxypropionate and D-limonene.

16. A stripping composition according to claim 8, wherein activator (E) comprises at least one of ethyl 3-ethoxypropionate and D-limonene.

17. A stripping composition according to claim 9, wherein activator (E) comprises at least one of ethyl 3-ethoxypropionate and D-limonene.

18. A stripping composition according to claim 10, wherein activator (E) comprises at least one of ethyl 3-ethoxypropionate and D-limonene.

19. A stripping composition according to claim 11, wherein activator (E) comprises at least one ethyl 3-ethoxypropionate and D-limonene.

20. A stripping composition according to claim 1, wherein the dispersant (F) comprises an acidic phosphoric ester of 2-ethylhexanol.

21. A stripping composition according to claim 19, wherein the dispersant (F) comprises an acidic phosphoric ester of 2-ethylhexanol.

22. A method of stripping an external organic coating from a substrate, said method comprising applying a composition according to claim 1 to said external organic coating and thereafter removing the external organic coating from the substrate.

23. A method according to claim 21, wherein the external organic coating comprises an exterior waterproof coating, a thick plastic coating or a thin film.

24. A method according to claim 21, wherein the exterior organic coating comprises an antifouling coating and the substrate comprises a surface of a boat.

* * * * *

UNITED STATES PATENT AND TRADEMARK OFFICE
CERTIFICATE OF CORRECTION

| | |
|---|---|
| PATENT NO. | : 6,534,461 B2 |
| DATED | : March 18, 2003 |
| INVENTOR(S) | : Jean-Pierre Lallier |

It is certified that error appears in the above-identified patent and that said Letters Patent is hereby corrected as shown below:

<u>Column 5,</u>
Lines 13 and 16, reads "comprise" should read -- comprises --
Line 18, reads "(G) methyl" should read -- (G) comprises methyl --

<u>Column 6,</u>
Line 23, reads "one ethyl" should read -- one of ethyl --

Signed and Sealed this

Ninth Day of November, 2004

JON W. DUDAS
*Director of the United States Patent and Trademark Office*